Patented May 17, 1932

1,858,244

UNITED STATES PATENT OFFICE

CLEMENS A. LAISE, OF TENAFLY, NEW JERSEY, ASSIGNOR TO CALLITE PRODUCTS COMPANY, INCORPORATED, OF UNION CITY, NEW JERSEY, A CORPORATION OF NEW JERSEY

REFRACTORY COMPOSITION

No Drawing.   Application filed May 14, 1930. Serial No. 452,513.

My invention relates to useful metal compositions and particularly to compositions combining properties of great hardness and strength. The constituent components consist of hard metallic carbides mixed with refractory non-metallic carbides and nitrides, glued together by saturating the pores of the compressed bodies of the above refractory metals with molten metals having a lower melting point than the compressed refractory bodies.

The composition so produced is of extreme hardness and toughness and may be used in the arts as a substitute for diamonds, especially for such purposes as cutting tools, grinding implements, wire drawing dies, watch jewels, swaging and punching dies, instruments requiring very sharp, hard edges, abrasives and numerous other purposes where extreme hardness and toughness is desired.

In making my new products, I first prepare or acquire a finely divided refractory metallic carbide, such as tungsten carbide, uranium carbide, molybdenum carbide, titanium carbide, etc., preferably in proportions of 85% to 60% by weight, and this is intimately mixed with very finely divided refractory non-metallic carbide, such as silicon carbide, aluminum carbide, boron carbide, beryllium carbide, aluminum-silicon carbide, etc. This is mixed with the above in the proportion of 2.5 to 25%, for example. To the mixture of these metallic and non-metallic carbides I may add .1 to 1% of a refractory nitride such as boron nitride, for example, although in some cases I find the refractory nitride unnecessary since the carbides in themselves tend to keep the compressed body porous. This refractory mixture I shall term mixture A.

Simultaneously with the preparation of the above mixture I prepare a finely divided powder of base metals such as nickel, cobalt, iron, etc. This powder should be as fine and sticky as possible and is usually prepared by reducing the oxalate of the metal with hydrogen. This is known as mixture B.

I may then proceed in either of two directions:

Procedure 1 consists in compressing mixture A into any desired shape, depending upon the purpose for which it is to be used. I then bake the same at a temperature of 800° C. to 1000° C., the baked compressed body then being immersed in a molten bath of mixture B. This produces a body which is glued together with a molten base metal, the base metal being absorbed from the molten bath or from molten metal which surrounds the compressed porous refractory carbide body by the compressed pieces of refractory carbide. In producing my composition the amount of base metal introduced into the finished product ranges from 5% to 30% by weight.

Procedure 2 produces a sintered composite refractory body as distinguished from the product of procedure 1 and consists in adding mixture B to mixture A in proportions of 5% to 30% by weight and ball milling for ten to thirty hours in order to produce a homogeneous mixture. The resultant mixture C is then pressed into shape suitable for the particular purposes for which the product is intended. Thus for dies, round discs with a small cylindrical hole are pressed, for tool bits, square pieces are pressed, etc. In the pressing operation I employ pressure of the order of twenty to fifty tons per square inch. The pressed pieces are then baked at about 900° C. to produce a fairly hard baked metallic body which can, however, still be shaped into any form desired. The pieces are finally subjected to a temperature necessary to produce complete sintering and hardening, the resultant product being of such a degree of hardness that it will cut glass and it can no longer be shaped with ordinary tools. The temperature required to accomplish this ranges from 1200 to 1700° C. and depends upon the ingredients used. The ingredients in turn depend upon the specific purpose for which the material is to be used and the operation is carried out in vacuum, or illuminating gas or other reducing gases.

I find that if the second heat treatment is performed in a vacuum a much more compact and hard body is produced.

I have found that tungsten carbide either of composition WC or W2C, preferably the former, in a proportion of 85% to 60% when mixed with very finely divided refractory silicon carbide in a proportion of 2.5 to 15%, glued together either by my sintering process with 10 to 30% of cobalt powder, or by my molten process when absorbing 10 to 30% molten cobalt, produces excellent results, especially when I add from .1 to 1% of refractory boron nitride to the refractory carbide mixture before compressing the same.

Although the specific ingredients just mentioned give me excellent results, I also find that such other carbides as uranium carbide, titanium carbide, molybdenum carbide and especially beryllium carbide, when mixed with such carbides as finely divided silicon carbide, boron carbide, aluminum carbide and glued together with molten cobalt, nickel, iron or similar base metals also produces very excellent results, the particular composition to be adopted depending upon the specific use for which the refractory product is to be employed.

It will be seen from the foregoing, therefore, that my invention consists in mixing a refractory metallic carbide with a refractory non-metallic carbide, and if desired with a refractory nitride, and then bonding them with a molten base metal in such a manner that a hard, compact, homogeneous body, harder than glass, will result.

I find that the product resulting from procedure 1 is tougher and stronger than the product resulting from procedure 2, although both products are exceedingly hard, approaching the hardness of diamonds and readily scratching glass.

I find also that the addition of the refractory non-metallic carbides to the refractory metallic carbides tend to harden the resultant composition and retard crystallization of metallic constituents when employed for working surfaces.

An effective means for immersing the compressed bodies of refractory carbides in the practice of procedure 1 is to suspend them from supports of tungsten or other refractory wire so that when the period of absorption and hardening has expired, they may be quickly lifted out of the bath by means of the supports and quickly cooled. The outer adhering film of the base metal on the body is then either machined off or removed by chemical means well known in the art. The immersion of the porous body in the bath of molten base metal may take place either in air, hydrogen, vacuum, or other reducing atmospheres and the body is permitted to remain in said bath long enough for the molten constituents to seep through the porous refractory body and fill up the pores and alloy with the refractory constituents.

The length of time for final sintering or immersion in molten metals depends upon size of body; usually about thirty minutes to two hours.

I find that under the first procedure a partial alloying of the base metal with the metal constituents of mixture A is obtained, so that in the finished product I have the benefit of cohesion as well as adhesion, thus producing a stronger and more elastic body than I obtain by sintering as in the second procedure wherein the particles are held together by adhesion only.

What I claim is:—

1. A composition of matter comprising tungsten carbide 60% to 85% mixed with a finely divided silicon carbide 2.5 to 15% bonded with molten cobalt 5% to 30%.

2. A composition of matter comprising tungsten carbide, 60% to 85%, mixed with finely divided silicon carbide 2.5 to 15% ing added thereto .1% to 1% of a boron nitride and bonded with a molten metal of the iron group, 1% to 30%.

This specification signed this 6th day of May, 1930.

CLEMENS A. LAISE.

CERTIFICATE OF CORRECTION.

Patent No. 1,858,244.                             Granted May 18, 1932, to

CLEMENS A. LAISE.

It is hereby certified that error appears in the printed specification of the above numbered patent requiring correction as follows: Page 2, line 85, claim 2, for the syllable "ing" read having; and that the said Letters Patent should be read with this correction therein that the same may conform to the record of the case in the Patent Office.

Signed and sealed this 21st day of June, A. D. 1932.

M. J. Moore,
Acting Commissioner of Patents.

(Seal)